(12) United States Patent
Daijo (10) Patent No.: US 8,558,266 B2
(45) Date of Patent: Oct. 15, 2013

(54) LED LIGHTING DEVICE

(75) Inventor: Kazuhiro Daijo, Osaka (JP)

(73) Assignee: Panasonic Corporation, Osaka (JP)

( * ) Notice: Subject to any disclaimer, the term of this patent is extended or adjusted under 35 U.S.C. 154(b) by 26 days.

(21) Appl. No.: 13/498,173

(22) PCT Filed: Sep. 5, 2011

(86) PCT No.: PCT/JP2011/004955
§ 371 (c)(1),
(2), (4) Date: Mar. 26, 2012

(87) PCT Pub. No.: WO2012/032757
PCT Pub. Date: Mar. 15, 2012

(65) Prior Publication Data
US 2012/0181567 A1 Jul. 19, 2012

(30) Foreign Application Priority Data
Sep. 9, 2010 (JP) ................. 2010-201657

(51) Int. Cl.
*H01L 33/00* (2010.01)
(52) U.S. Cl.
USPC ........................................... 257/98
(58) Field of Classification Search
USPC ............ 257/79–103, 918, E51.018–E51.022, 257/E33.001–E33.077, E31.058, E31.063, 257/E31.115, E25.032, E27.133–E27.139, 257/667, 125, 164, 198, 514, E29.315, 257/E21.403, 40, 642–643, 759, 257/E51.001–E51.052, E25.008–E25.009, 257/116, 117, 749, E33.056–E33.059, 186, 257/E31.005, E23.114–E23.115, 233–292, 257/431–466, 9–39; 438/22–47, 69, 493, 438/503, 507, 956, 48, 82, 99, 51, 55, 438/64–68, 83, 98; 349/67, 62, 65; 352/34, 352/57, 162, 163, 165, 198, 242; 355/45, 355/67
See application file for complete search history.

(56) References Cited

U.S. PATENT DOCUMENTS 8,405,797 B2 * 3/2013 Chang et al. ................... 349/65
8,414,173 B2 * 4/2013 Masuda et al. ................ 362/606

(Continued)

FOREIGN PATENT DOCUMENTS

| JP | 10241414 A | 9/1998 |
|---|---|---|
| JP | 2004327955 A | 11/2004 |
| JP | 2007087638 A | 4/2007 |
| JP | 2007241113 A | 9/2007 |

OTHER PUBLICATIONS

International Application Serial No. PCT/JP2011/004955, International Search Report mailed Dec. 6, 2011, 1 pg.

*Primary Examiner* — Dao H Nguyen
*Assistant Examiner* — Tram H Nguyen
(74) *Attorney, Agent, or Firm* — RatnerPrestia (57) ABSTRACT

In an LED lighting device of the present invention, the reflecting surface of the light guide body is formed of division lines and a connection line connecting between the division lines. Each division line divides a cross section line of a virtual reflecting surface crossing projection lines. Each projection line is radially drawn at a selected angle from a selected point of a given distance away from a center point of the LED element toward the cross section line of the virtual reflecting surface of the light guide body. Each division line is adjusted by similar amplification or similar contraction so as to be contained within the thickness line with its length large enough to receive all the incoming light.

7 Claims, 5 Drawing Sheets

(56) References Cited

U.S. PATENT DOCUMENTS

| | | | |
|---|---|---|---|
| 8,416,363 B2* | 4/2013 | Shikii et al. | 349/62 |
| 8,427,602 B2* | 4/2013 | Mun et al. | 349/65 |
| 2002/0101550 A1* | 8/2002 | Yeh | 349/65 |
| 2004/0207775 A1* | 10/2004 | Min et al. | 349/65 |
| 2009/0316075 A1* | 12/2009 | Bae et al. | 349/65 |
| 2010/0328581 A1* | 12/2010 | Shiraishi et al. | 349/65 |
| 2011/0187967 A1* | 8/2011 | Shinohara et al. | 349/65 |

\* cited by examiner

LED LIGHTING DEVICE

TECHNICAL FIELD

The present invention relates to a lighting device, particularly to an LED lighting device with an LED element applied thereto.

BACKGROUND ART

In recent years, mobile electronic devices have become widely used such as a mobile phone and a camera including an LED lighting device with an LED element applied thereto (refer to patent literature 1 for example).

Figure 5:
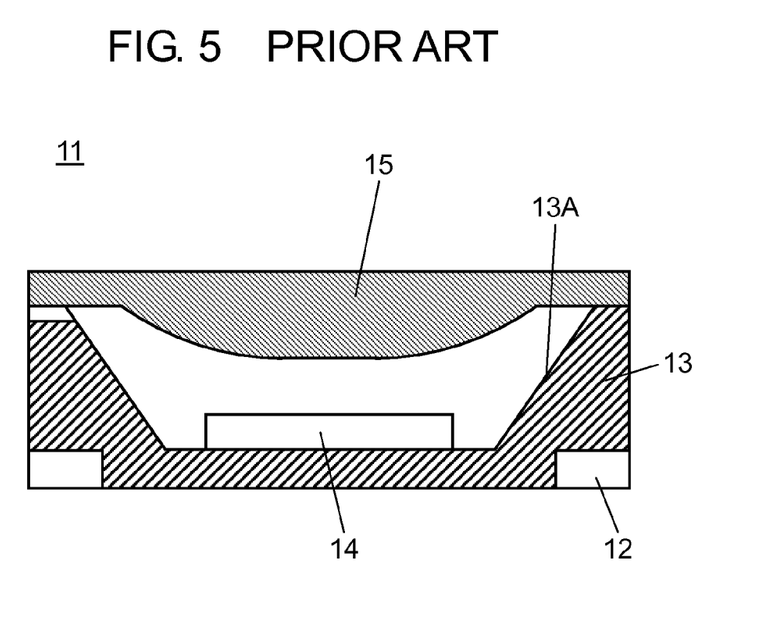
FIG. 5 is a sectional view of a conventional LED lighting device.

Hereinafter, a description is made of a configuration of a conventional LED lighting device described in patent literature 1 using FIG. 5. FIG. 5 is a sectional view of the conventional LED lighting device.

As shown in FIG. 5, LED lighting device 11 is composed of circuit substrate 12 with an electrode pattern formed thereon; packaging body 13 mounted on circuit substrate 12, including reflecting surface 13A; LED element 14 as a light-emitting element fixed to packaging body 13; and lens body 15 provided on packaging body 13.

LED lighting device 11 has lens body 15 disposed facing the upper side (close to an irradiation target) of LED element 14. This structure reflects light emitted from LED element 14 on reflecting surface 13A of packaging body 13 and collects light reflected and emitted upward with lens body 15. Consequently, LED lighting device 11 is obtained with a favorable amount of light radiation.

With conventional LED lighting device 11, however, lens body 15 as a light-emitting surface is disposed so as to face the upper side of LED element 14 to ensure appropriate light distribution. Accordingly, the thickness of LED lighting device 11 itself increases, which is unfavorable when incorporating the lighting device into a mobile electronic device which requires downsizing and slimming down.

Hence, in order to solve the above-described problem (i.e. the thickness of LED lighting device 11), a light guide body used for such as a lighting device for a liquid crystal display device of sidelight type may be used for light distribution. However, a light guide body is usually used for emitting light onto the liquid crystal display panel directly above the light guide body from the side surface of the panel, and does not support light distribution when photographing with a mobile electronic device such as a mobile phone and a camera.

For this reason, an LED lighting device is desired that can decrease its thickness while ensuring favorable light distribution.

CITATION LIST

Patent Literature

PTL 1 Japanese Patent Unexamined Publication No. 2004-327955

SUMMARY OF THE INVENTION

The present invention is an LED lighting device that includes an LED module for fixing an LED element and a light guide body placed in parallel facing the LED element side of the LED module, having a reflecting surface. The LED lighting device irradiates light emitted from the LED element of the LED module and propagated through the inside of the light guide body by reflecting the light on the reflecting surface of the light guide body in the irradiation axis. The reflecting surface of the light guide body is formed of division lines and a connection line connecting between the division lines. Each division line divides a cross section line of a virtual reflecting surface crossing projection lines. Each projection line is radially drawn at a selected angle from a selected point of a given distance away from a center point of the LED element toward the cross section line of the virtual reflecting surface of the light guide body. Each division line is adjusted by similar amplification or similar contraction so as to be contained within the thickness line with its length long enough to receive all the incoming light.

This structure allows the reflecting surface of the light guide body to reflect all the light emitted from the LED element and propagated through the inside of the light guide body and to irradiate an irradiation target in the direction of the irradiation axis. Consequently, light from the LED element is effectively used and favorable light distribution characteristics are ensured. Further, the thickness of the LED lighting device can be made smaller (thinner) as compared to a conventional LED lighting device. Normally, the thickness increases (thicker) because the reflecting surface is formed of a virtual reflecting surface. In this embodiment, however, the cross section line of the virtual reflecting surface is divided as appropriate, and each division line is adjusted by similar amplification or similar contraction so as to be contained within a given thickness range (e.g. approximately the thickness of the LED module), which allows the thickness of the LED lighting device to be smaller while ensuring favorable light distribution characteristics (equivalent to the reflection characteristics on the virtual reflecting surface not divided).

DESCRIPTION OF EMBODIMENTS

Hereinafter, a description is made of an LED lighting device according to some embodiments of the present invention with reference to the related drawings. An identical or equivalent component is given the same reference mark in the following description.

First Exemplary Embodiment

Hereinafter, a description is made of an LED lighting device according to the first exemplary embodiment of the present invention using FIGS. 1A and 1B.

Figure 1A:
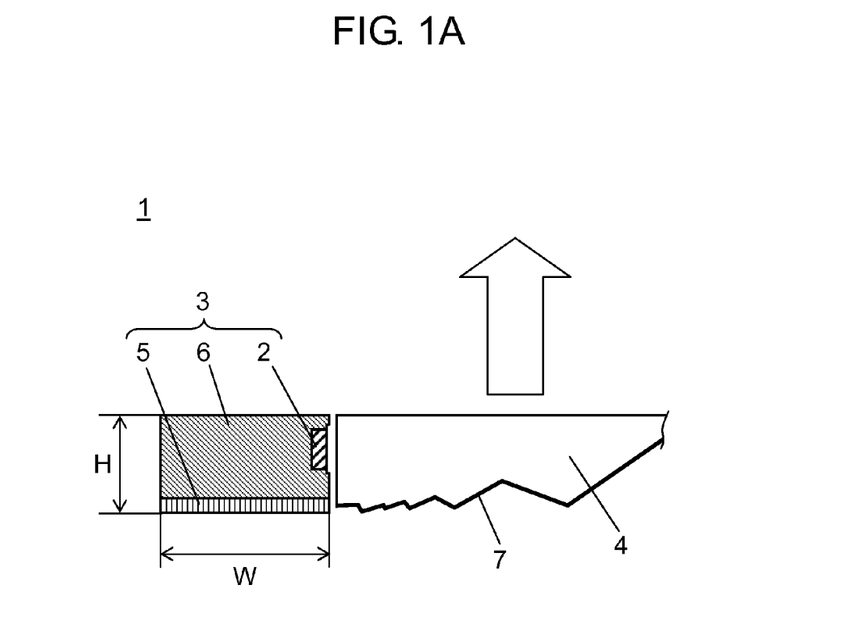
FIG. 1A is a sectional view showing a configuration of an LED lighting device according to a first exemplary embodiment of the present invention, taken along line 1A-1A of FIG. 1B.
Figure 1B:
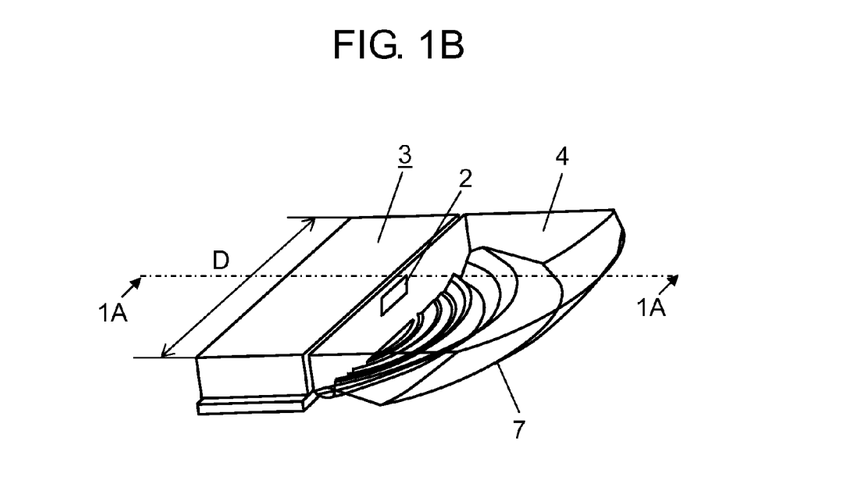
FIG. 1B is a perspective view showing the configuration of the LED lighting device according to the same embodiment of the present invention.

FIG. 1A is a sectional view illustrating a configuration of the LED lighting device, taken along line 1A-1A of FIG. 1B according to the first exemplary embodiment of the present invention. FIG. 1B is a perspective view illustrating the configuration of the LED lighting device according to the first exemplary embodiment of the present invention.

As shown in FIGS. 1A and 1B, LED lighting device 1 of this embodiment includes at least LED module 3 for fixing LED element 2; and light guide body 4 placed in parallel facing the side of LED element 2 of LED module 3, having reflecting surface 7. LED module 3, with the shape of a substantially or completely rectangular solid for example, includes circuit substrate 5 with an electrode pattern formed thereon; packaging body 6 mounted on circuit substrate 5; and LED element 2 functioning as a light-emitting element fixed on a surface provided parallel to light guide body 4 on the inner surface of packaging body 6.

LED lighting device 1 is structured so that light (incoming light) emitted from LED element 2 of LED module 3 is propagated through the inside of light guide body 4 and is reflected on reflecting surface 7 of light guide body 4, to irradiate in the direction of the irradiation axis (the direction of the arrow in FIG. 1A), the forward direction for example.

In this embodiment, as shown in FIGS. 1A and 1B, thickness H along the irradiation axis of LED module 3 is composed of the thickness of packaging body 6 (e.g. approximately 0.4 mm) and that of circuit substrate 5 (e.g. approximately 0.1 mm). Width W of LED module 3 along light guide body 4 of LED module 3 is 1 mm and depth D is 2.8 mm.

Further, light guide body 4, formed of a transparent resin such as acrylic resin, is structured so that incoming light emitted from LED element 2 of LED module 3 is propagated through the inside of light guide body 4 while undergoing total reflection and reflecting on the reflecting surface. At this moment, the thickness of light guide body 4 is substantially or completely the same as thickness H of LED module 3 for example. The width (in the direction orthogonal to the irradiation axis) of light guide body 4 is substantially or completely the same as depth D of LED module 3 (i.e. packaging body 6 and circuit substrate 5) for example.

The undersurface of light guide body 4 has reflecting surface 7 formed thereon for reflecting incoming light that has been emitted from LED element 2 of LED module 3 and has been propagated through the inside of light guide body 4. Light (reflected light) reflected on reflecting surface 7 of light guide body 4 is emitted from light guide body 4 in the direction of the irradiation axis (the direction of the arrow in FIG. 1A) to irradiate an irradiation target. Here, reflecting surface 7 of light guide body 4 is coated with a reflective film formed of such as a metal film (e.g. aluminum (Al)) and a multilayer film (e.g. titanium nitride (TiN)).

Hereinafter, a description is made of how to form (design concept) reflecting surface 7 of light guide body 4 of LED lighting device 1 using FIGS. 2A through 2C.

Figure 2A:
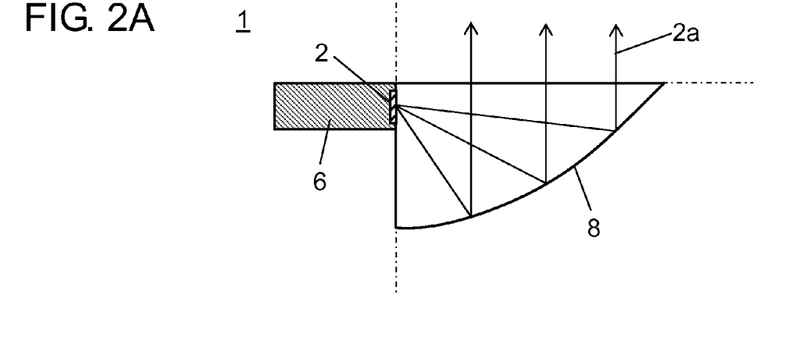
FIG. 2A is a sectional view illustrating a cross section line of a virtual reflecting surface of the LED lighting device according to the same embodiment of the present invention.

FIG. 2A is a sectional view illustrating a cross section line of a virtual reflecting surface of an LED lighting device according to the first exemplary embodiment of the present invention. FIG. 2B is a sectional view illustrating circumstances in which the cross section line of the virtual reflecting surface of the LED lighting device is divided and adjusted by similar contraction. FIG. 2C is a sectional view illustrating a state in which the cross section line has been adjusted by similar contraction.

At this moment, as shown in FIG. 2A, cross section line 8 of the virtual reflecting surface of light guide body 4 indicates a reflecting surface on which incoming light emitted from LED element 2 of LED module 3 and propagated through the inside of light guide body 4 is reflected to provide appropriate light distribution 2a in the direction of the irradiation axis. Here, cross section line 8 of the virtual reflecting surface of light guide body 4 has a curved surface with respect to the vertical direction (direction of depth D in FIG. 1B) of the paper surface of FIG. 2A as shown by reflecting surface 7 of FIG. 1B.

Figure 2B:
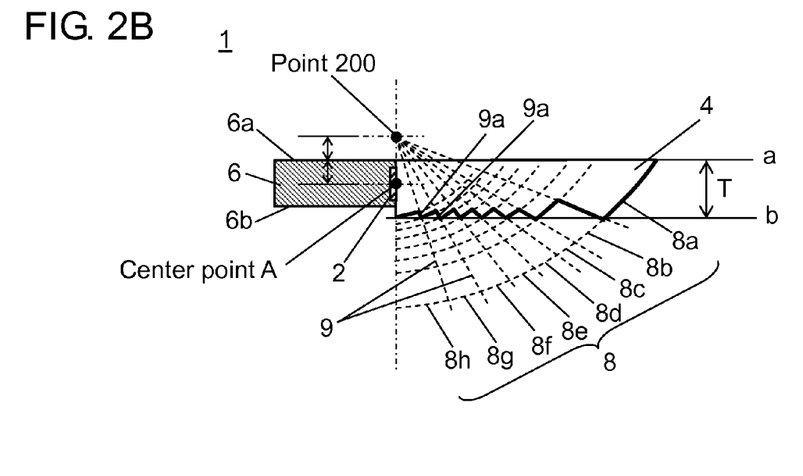
FIG. 2B is a sectional view illustrating circumstances in which the cross section line is divided and adjusted by similar contraction according to the same embodiment of the present invention.

First, as shown in FIG. 2B, point 200 is set to a position (in this embodiment, a position symmetric with center point A of LED element 2 about top surface 6a of light guide body 4 in the direction of the irradiation axis) away from center point A of LED element 2 of LED lighting device 1 by a given distance, for example to a position parallel to the irradiation axis from center point A of LED element 2.

Next, as shown in FIG. 2B, projection line 9 is radially drawn down from point 200 toward cross section line 8 of the virtual reflecting surface described in FIG. 2A at a selected (given) angle. Then, cross section line 8 of the virtual reflecting surface is divided at the point where projection line 9 drawn down crosses cross section line 8 of the virtual reflecting surface, having cross section line 8 divided be division lines 8a, 8b, 8c, 8d, 8e, 8f, 8g, and 8h. In this embodiment, a description is made of an example of eight division lines hereinafter; however, the invention is obviously not limited to this example.

Next, out of eight division lines 8a, 8b, 8c, 8d, 8e, 8f, 8g, and 8h, division lines 8b, 8c, 8d, 8e, 8f, 8g, and 8h (excluding farthest division line 8a), which are not contained within thickness line T (between lines a and b in FIG. 2B, where all the incoming light from LED element 2 can be received) are adjusted by similar contraction so as to be contained within thickness line T (between lines a and b). Here, division lines 8b, 8c, 8d, 8e, 8f, 8g, and 8h are adjusted by similar contraction along adjacent projection lines 9 so as to be contained between projection lines 9. Then, as shown in FIG. 2B, division lines 8b, 8c, 8d, 8e, 8f, 8g, 8h are adjusted by similar contraction so that each one end (each underside end in FIG. 2B) of them agrees with line b of thickness line T.

Here, the distance of thickness line T is preferably thickness H of LED module 3 in consideration of slimming down; however, the distance is not particularly limited as long as T≥the thickness (i.e. the distance between top surface 6a and undersurface 6b) of packaging body 6.

Next, respective division lines (e.g. division lines 8b and 8c) out of division lines 8b, 8c, 8d, 8e, 8f, 8g, and 8h adjusted by similar contraction are connected with connection line 9a connecting along projection line 9 passing through the connection point of a division line crossing projection line 9, or with connection line 9a provided at an angle smaller than that formed by projection line 9 crossing the irradiation axis toward light guide body 4. Herewith, a cross section line is formed of the group of curved division lines and the connection line, thereby forming reflecting surface 7 of light guide body 4. Here, when connection is made with connection line 9a provided at an angle smaller than that formed by projection line 9 crossing the irradiation axis toward light guide body 4, connection line 9a is connected to its adjacent division line with a line along line b in FIG. 2B.

Figure 2C:
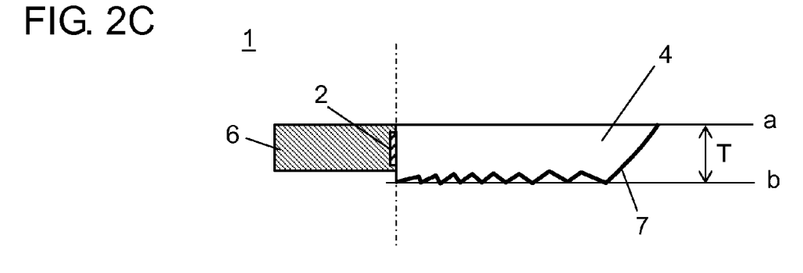
FIG. 2C is a sectional view illustrating a state in which the cross section line has been adjusted by similar contraction according to the same embodiment of the present invention.

Forming reflecting surface 7 of light guide body 4 as described above provides LED lighting device 1 including light guide body 4 having reflecting surface 7 and LED module 3 as shown in FIG. 2C.

As described above, according to this embodiment, reflecting surface 7 of light guide body 4 is formed so that all the light (incoming light) emitted from LED element 2 can irradiate an irradiation target in the direction of the irradiation axis. This structure allows all the light (incoming light) emitted from LED element 2 to be reflected on reflecting surface 7 of light guide body 4 and to irradiate an irradiation target in the direction of the irradiation axis, thereby ensuring favorable light distribution characteristics.

Further, an LED lighting device can be mounted thinner and smaller than a case where the lens body (i.e. light-emitting surface) is placed facing the upper side (close to an irradiation target) of LED element 2 as a conventional LED lighting device.

Second Exemplary Embodiment

Hereinafter, a description is made of an LED lighting device according to the second exemplary embodiment of the present invention using FIG. 3.

Figure 3:
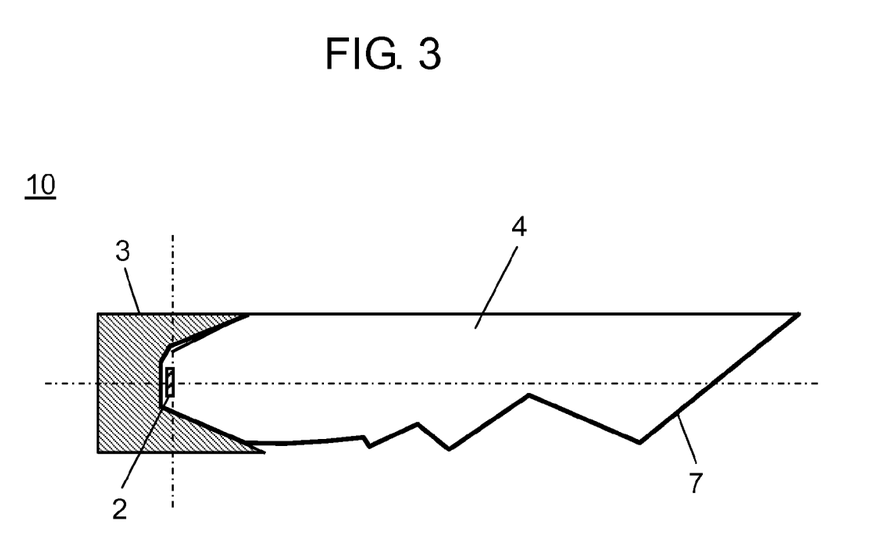
FIG. 3 is a sectional view illustrating a unified configuration of the LED element and the light guide body of an LED lighting device according to a second exemplary embodiment of the present invention.

FIG. 3 is sectional view illustrating a unified configuration of the LED element and the light guide body of the LED lighting device according to the second exemplary embodiment.

As shown in FIG. 3, LED lighting device 10 of this embodiment is different from LED lighting device 1 of the first embodiment in that LED module 3 fixing LED element 2 and light guide body 4 having reflecting surface 7 are formed integrally.

More specifically, as shown in FIG. 3, LED lighting device 10 is provided so that reflecting surface 7 of light guide body 4 surrounds surfaces other than the light-emitting surface of LED element 2 and light-radiating surface from the side of LED module 3 toward the side of light guide body 4.

According to this embodiment, the efficiency of collecting light emitted from LED element 2 can be increased by reflecting light leaking into LED module 3 out of light emitted from LED element 2, on reflecting surface 7 of light guide body 4. Consequently, further favorable light distribution characteristics (brightness, illumination intensity) can be ensured. Further, electric power applied to the LED element can be reduced for the same level of illuminance on an irradiation target.

In the same way as the first embodiment, an LED lighting device can be mounted thinner and smaller than a conventional LED lighting device.

The present invention is not limited to the above-described embodiments, but obviously modifications may be added as appropriate within a scope that does not deviate from the gist of the present invention.

In LED lighting device 1 of the first embodiment, the description is made of the following case, but not limited to it. That is, point 200 is set to a position (in this embodiment, a position symmetric with center point A of LED element 2 about top surface 6a of light guide body 4 in the direction of the irradiation axis) away from center point A of LED element 2 of LED lighting device 1 by a given distance, and at the same time to a position parallel to the irradiation axis from center point A of LED element 2. For example, division lines may be formed by radially drawing down projection lines from a selected point other than point 200 provided at the above-described position. Herewith, an LED lighting device can be implemented including a light guide body having a given reflecting surface according to an application purpose, desired light distribution characteristics, and a desired shape (e.g. downsizing, slimming down).

That is to say, point 200 may be set being moved along the forward direction of the irradiation axis by the width of LED element 2 in the direction of the irradiation axis. More specifically, division lines are formed by dividing cross section line 8 of the virtual reflecting surface of light guide body 4 that provides appropriate light distribution out of incoming light emitted from LED element 2 and propagated through the inside of light guide body 4, by means of multiple projection lines 9 radially drawn down at a selected angle crossing the irradiation axis toward light guide body 4, so as to be contained in the inside of the curved surface (i.e. reflecting surface 7) farthest from point 200. At this moment, the division lines other than the farthest one are adjusted by similar contraction and connected with connection line 9a to form reflecting surface 7. Then, point 200 can be provided so that all the incoming light is reflected on reflecting surface 7 of light guide body 4 to irradiate an irradiation target in the direction of the irradiation axis.

In LED lighting device 1 of the first embodiment, the description is made of the light distribution characteristics for one LED lighting device 1 as an example, but the invention is not limited to this example. For example, as described using FIGS. 4A through 4D, multiple LED lighting devices 1 may be arranged.

Hereinafter, a description is made of a configuration in which multiple LED lighting devices 1 are arranged using FIGS. 4A through 4D.

Figure 4A:
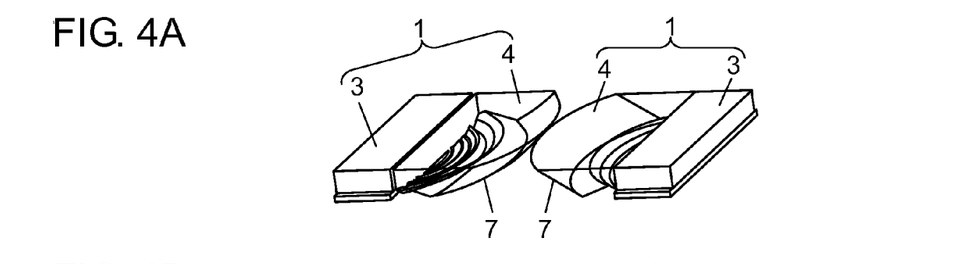
FIG. 4A is a perspective view illustrating a configuration in which the light guide bodies of two LED lighting devices according to the same embodiment are placed in parallel facing each other.
Figure 4B:
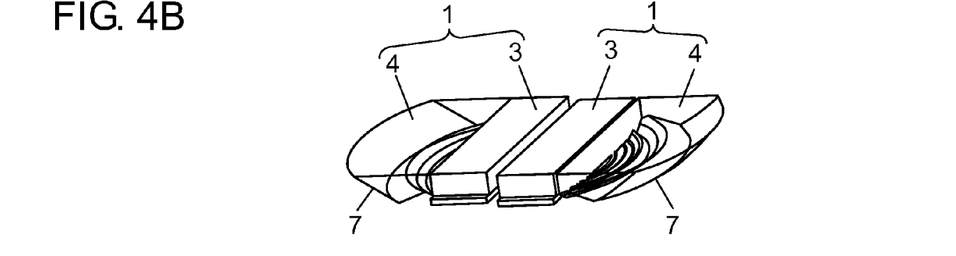
FIG. 4B is a perspective view illustrating a configuration in which the LED modules of two LED lighting devices according to the same embodiment are placed in parallel facing each other.
Figure 4C:
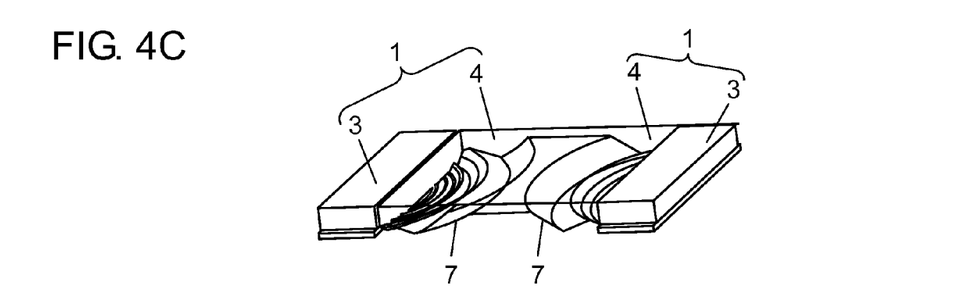
FIG. 4C is a perspective view illustrating a configuration in which the light guide bodies of two LED lighting devices according to the same embodiment are placed in parallel facing each other and are unified.
Figure 4D:
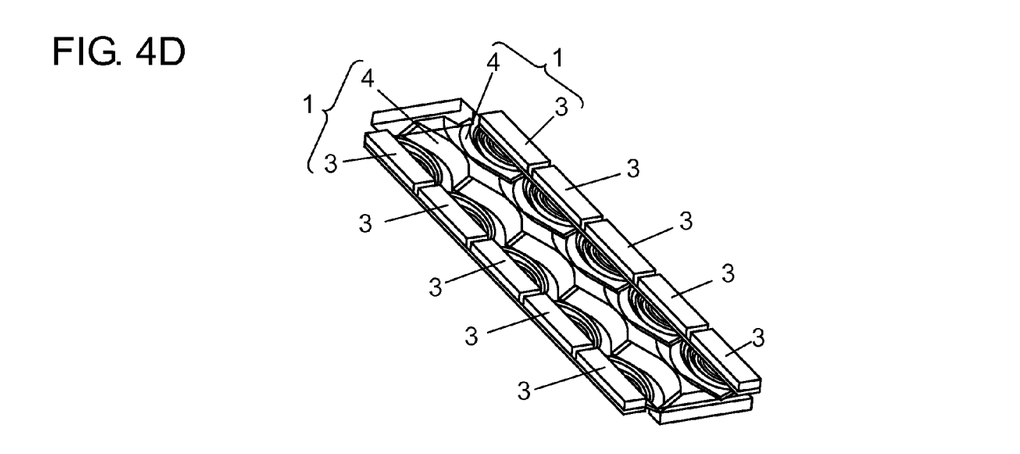
FIG. 4D is a perspective view illustrating a configuration in which multiple LED lighting devices according to the same embodiment are arranged in parallel and each set of light guide bodies of the LED lighting devices face each other.

FIG. 4A is a perspective view illustrating a configuration in which the light guide bodies of two LED lighting devices according to the same embodiment are placed in parallel facing each other. FIG. 4B is a perspective view illustrating a configuration in which the LED modules of two LED lighting devices according to the same embodiment are placed in parallel facing each other. FIG. 4C is a perspective view illustrating a configuration in which the light guide bodies of two LED lighting devices according to the same embodiment are placed in parallel facing each other and are unified. FIG. 4D is a perspective view illustrating a configuration in which multiple LED lighting devices according to the same embodiment are arranged in parallel and each set of light guide bodies of the LED lighting devices face each other.

First, as shown in FIG. 4A, light guide bodies 4 having reflecting surfaces 7, of two LED lighting devices 1 are placed in parallel facing each other.

As shown in FIG. 4B, LED modules 3 of two LED lighting devices 1 are placed in parallel facing each other.

As shown in FIG. 4C, light guide bodies 4 of two LED lighting devices 1 are placed in parallel facing each other and are unified.

As shown in FIG. 4D, in two sets of modules formed of multiple (e.g. five) LED lighting devices 1 arranged in parallel, light guide bodies 4 having reflecting surfaces 7, of the modules are arranged facing each other.

This arrangement allows implementing optimum light distribution characteristics by freely combining LED lighting devices 1 according to an irradiation target and an application purpose.

In LED lighting device 1 of the first embodiment, the description is made of the configuration in which depth D of LED module 3 is substantially or completely the same as depth D of light guide body 4 as an example as shown in FIG. 1B, but not limited to the example. For example, the depth of light guide body 4 may be different from that of LED module 3, which facilitates conforming to the shape of an electronic device incorporating LED lighting device 1.

In LED lighting device 1 of the first embodiment, the description is made of the configuration in which only LED module 3 is mounted on circuit substrate 5 as an example, but not limited to the example. For example, light guide body 4 may be mounted on circuit substrate 5. At this moment, to slim down the LED lighting device, thickness H of light guide body 4 is preferably made conform to the thickness of the packaging body of the LED lighting device, but not limited to this case when slimming down is not requested. The configuration allows ensuring favorable light distribution characteristics while downsizing LED lighting device 1.

In LED lighting device 10 of the second embodiment, the description is made of the configuration in which one LED lighting device 10 is used, as an example, but not limited to the example. For example, as described using FIGS. 4A through 4D, multiple LED lighting devices 10 may be arranged. In the LED lighting devices of the first and second embodiments, the description is made of the following example, but not limited to the example. That is, cross section line 8 of the virtual reflecting surface is divided so as to contain the curved surface (reflecting surface 7) farthest from point 200 within thickness line T to form division lines, and the division lines other than the farthest one are adjusted by similar contraction. For example, the following way may be used. That is, only the nearest division line is adjusted by similar contraction, and the other division lines are adjusted by similar amplification so as not to exceed the thickest part of the cross section line of the virtual reflecting surface to be connected with connection line 9a. In this case, the length of the light guide body relatively increases. Herewith, extending the length of the light guide body makes the light distribution characteristics of the LED lighting device more favorable as well as reducing the thickness of the light guide body, eventually of the LED lighting device.

The present invention is an LED lighting device that includes an LED module for fixing an LED element and a light guide body placed in parallel facing the LED element side of the LED module, having a reflecting surface. The LED lighting device irradiates light emitted from the LED element of the LED module and propagated through the inside of the light guide body by reflecting the light on the reflecting surface of the light guide body in the irradiation axis. The reflecting surface of the light guide body is formed of division lines and a connection line connecting between the division lines. Each division line divides a cross section line of a virtual reflecting surface crossing projection lines. Each projection line is radially drawn at a selected angle from a selected point of a given distance away from a center point of the LED element toward the cross section line of the virtual reflecting surface of the light guide body. Each division line is adjusted by similar amplification or similar contraction so as to be contained within a thickness line with its distance large enough to receive all the incoming light.

This structure allows reflecting all the light emitted from the LED element and propagated through the inside of the light guide body, on the reflecting surface of the light guide body, to irradiate an irradiation target in the direction of the irradiation axis. Consequently, light from the LED element is effectively used and favorable light distribution characteristics are ensured. Further, the thickness of the LED lighting device can be decreased (thinner) as compared to a conventional LED lighting device. Normally, the thickness increases (thicker) because a reflecting surface is formed of the cross section line of the virtual reflecting surface. In this embodiment, however, the cross section line of the virtual reflecting surface is divided as appropriate, and each division line is adjusted by similar amplification or similar contraction so as to be contained within a given thickness range (e.g. approximately the thickness of the LED module), which allows the thickness of the LED lighting device to be smaller while ensuring favorable light distribution characteristics (i.e. the reflection characteristics on the virtual reflecting surface not divided).

In the present invention, the selected point is preferably set in the direction parallel to the irradiation axis from the center point of the LED element, thereby efficiently reflecting light from the LED element totally reflected on the surface of the light guide body, within a valid range.

In the present invention, the selected point is preferably set to a position symmetric with the center point of the LED element about the top surface of the light guide body in the direction of the irradiation axis, thereby efficiently reflecting light from the LED element totally reflected on the surface of the light guide body, within a valid range.

In the present invention, preferably the division lines are adjusted by similar amplification or similar contraction so as to be contained between projection lines, thereby implementing a slim LED lighting device.

In the present invention, the thickness line preferably agrees with the thickness of the LED module, thereby containing the thickness of the light guide body within the thickness range of the LED module to downsize the LED lighting device.

In the present invention, preferably the LED module and the light guide body are integrally provided and the reflecting surface of the light guide body is provided so as to surround surfaces other than the light-emitting surface of the LED element and the light-irradiating surface of the LED module, thereby increasing the efficiency of collecting light emitted from the LED element 2 to ensure further favorable light distribution characteristics (brightness, illumination intensity).

Industrial Applicability

An LED lighting device of the present invention is useful for a mobile electronic device such as a mobile phone and a camera that demands downsizing and slimming down while ensuring favorable light distribution.

Reference Marks in the Drawings

1, 10, 11 LED lighting device
2 LED element
2a Light distribution
3 LED module
4 Light guide body
5 Circuit substrate
6, 13 Packaging body
6a Top surface
6b Undersurface
7, 13A Reflecting surface
8 Cross section line of virtual reflecting surface
8a, 8b, 8c, 8d, 8e, 8f, 8g, 8h Division line
9 Projection line
9a Connection line 12 Circuit substrate
14 LED element
15 Lens body

The invention claimed is:

1. An LED lighting device comprising:
an LED module for fixing an LED element; and
a light guide body placed in parallel with the LED module, facing an LED element side of the LED module, having a reflecting surface,
wherein the LED lighting device irradiates light emitted from the LED element of the LED module and propagated through the inside of the light guide body by reflecting the light on the reflecting surface of the light guide body in a direction of an irradiation axis, and
wherein the reflecting surface is formed of division lines and a connection line connecting between the division lines, each division line dividing a cross section line of a virtual reflecting surface crossing projection lines, each projection line drawn radially at a selected angle from a selected point of a given distance away from a center point of the LED element toward the cross section line of the virtual reflecting surface of the light guide body, and each division line being adjusted by similar amplification or similar contraction so as to be contained within a thickness line whose distance is large enough to receive all incoming light.

2. The LED lighting device of claim 1, wherein the connection line connects between the division lines along the projection line or at an angle smaller than an angle formed between the projection line and the irradiation axis.

3. The LED lighting device of claim 1, wherein the selected point is set in the direction of the irradiation axis from the center point of the LED element.

4. The LED lighting device of claim 2, wherein the selected point is set to a position symmetric with the center point of the LED element about a top surface of the light guide body in the direction of the irradiation axis.

5. The LED lighting device of claim 1, wherein the division lines are adjusted by similar amplification or similar contraction so as to be contained between the projection lines.

6. The LED lighting device of claim 1, wherein the thickness line agrees with a thickness of the LED module.

7. The LED lighting device of claim 1, wherein the LED module and the light guide body are integrally provided and the reflecting surface of the light guide body is provided so as to surround surfaces other than a light-emitting surface of the LED element and a light-radiating surface of the LED module.

* * * * *